April 26, 1938.  R. F. NEWTON  2,115,466

ARTICULATED RAILWAY TRUCK

Filed March 15, 1937

INVENTOR
Ray F. Newton
BY McDougall,
ATTORNEY

Patented Apr. 26, 1938

2,115,466

UNITED STATES PATENT OFFICE 2,115,466

ARTICULATED RAILWAY TRUCK

Ray F. Newton, San Francisco, Calif.

Application March 15, 1937, Serial No. 130,993

9 Claims. (Cl. 105—166)

My invention herein relates to trucks for high speed transportation systems including a track and self-propelled vehicles of the coach type, either singly or in trains, and has for its principal object as delineated and described in this portion thereof, a truck which makes available the use of pneumatic tires on vehicles of this character that are adapted to run on steel rails.

An object of this invention subsidiary to the one above mentioned is a truck of the character described that is adapted to run upon and be guided by steel rails in which the side walls of the pneumatic tires are kept out of contact with the rails at all times.

Another object of my invention is a self guided truck of the character described in which the guiding is done by horizontal wheels which may be tired with either pneumatic tires or hard rubber tires and in which the guide wheels are kept in physical contact with the rail member and are shiftable with respect to the leading and trailing axles to make the truck reversible as to direction.

Another object of my invention is an articulated truck of the character described in which a pair of guide wheels is placed at each end of the truck in such a manner that a horizontal line drawn through the axes of the guide wheels will lie in a plane substantially ahead of the axes of the leading wheels of the truck that turning moment may be applied effectively to the leading pair of wheels.

Numerous other objects will be apparent to those skilled in the art to which this invention appertains or is most nearly connected, and which are set forth in the subjoined claims.

The structure herein shown is alternative to that shown, described and claimed in my Patent No. 2,076,914, patented April 13, 1937.

A drawing accompanies and forms a part of this specification in which,—

Fig. 1 is a view of the underside of an articulated six wheel truck provided with my new invention as hereinafter described, shown in the position the several parts of the truck will occupy while proceeding on a straight track in the direction of the arrow shown in this figure;

Fg. 2 is the same structure shown in Fig. 1 except that it has been shown on a curved piece of track and a special shifting of guide wheel gear has occurred to promote its ability to travel in the direction shown by the arrow in this figure.

Figure 3:
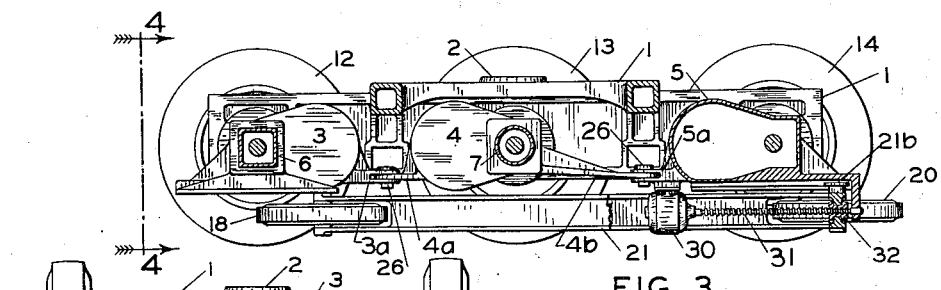
Fig. 3 is a longitudinal section on the line 3—3 of Fig. 1.
Figure 4:
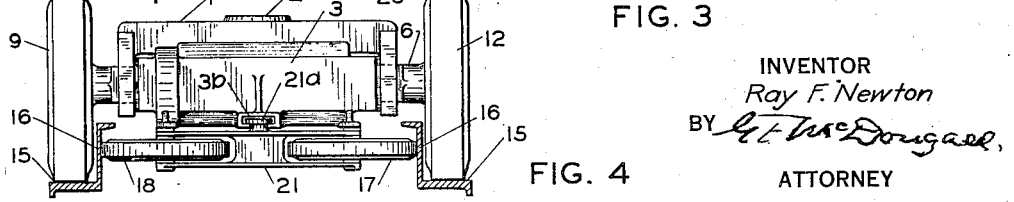
Fig. 4 is an end view from 4—4 of Fig. 3.

As will be noted from the views, the truck is a three unit articulated truck having a frame 1, which will be provided with a center plate on the top side as shown at numeral 2 in Figs. 3 and 4, upon which the weight of the body of a railway car will be carried.

The frame 1 is carried by the axle housings in the same manner as shown in my Patent No. 2,076,914, heretofore referred to, that is the end housings are swingable with respect to the axis of the frame and the center housing is movable in a plane normal to the said axis, to provide for movement around a curve without binding in the frame.

The center plate 2 will be provided with the usual center pin and suitable bearings for carrying the weight according to known art.

Motor housings 3, 4, and 5, diagrammatically represent means of applying power to the axles 6, 7, and 8, thence to the load wheels, 9, 10, 11, 12, 13, and 14 which are shown to be equipped with pneumatic tires, not given a specific numerical designation.

The motor housings 3, 4, and 5 diagrammatically represent any means of applying power to the axles, the wheels and thus power to the truck to propel the car.

Articulation arms 3a, 4a, 4b, and 5a are shown integral with the motor housings 3, 4, and 5 and are pivoted together at 26, the pivots being equidistant from the axles.

A preferred cross section of track is shown in Fig. 4 in which 15 represents the tread upon which the wheels such as 9 and 12 will roll and in which 16 is an integral upstanding flange against which the guide wheels 17 and 18 are adapted to bear in the manner hereinafter pointed out in detail.

The guide wheels 17, 18, 19, and 20 are rotatably mounted at 17a, 18a, 19a and 20a. The guide wheel frame 21, is preferably of rectangular general outline with suitable bracing and is provided with a pair of mountings such as 21a and 21b that are arranged to be longitudinally movably mounted in the guides 3b and 5b but are restrained against other movement.

An important feature of this construction which is set forth in detail in my patent hereinbefore referred to, is the manner of articulating the units of the truck by the articulation joints such as 25 and 26, which are shown to be equidistantly spaced between the axles, in this case three. Also as disclosed in the patent referred to, abutting arcuate bearing surfaces are provided at each end of the end axle mounting, which are in frictional contact with adjacent portions of the frame 1. This provision always keeps the end axle mountings in the same relative position with respect to the main frame 1, while the center axle is to a sufficient extent movable in an endwise direction in respect to the frame 1, in order that the articulated truck as a whole may round a curve without bringing any of the load wheels such as 9, 10, 11, 12, 13, and 14 into contact with the upstanding flange 16 of the rail. These features, however, are more fully set forth in the patent referred to.

Figure 2:
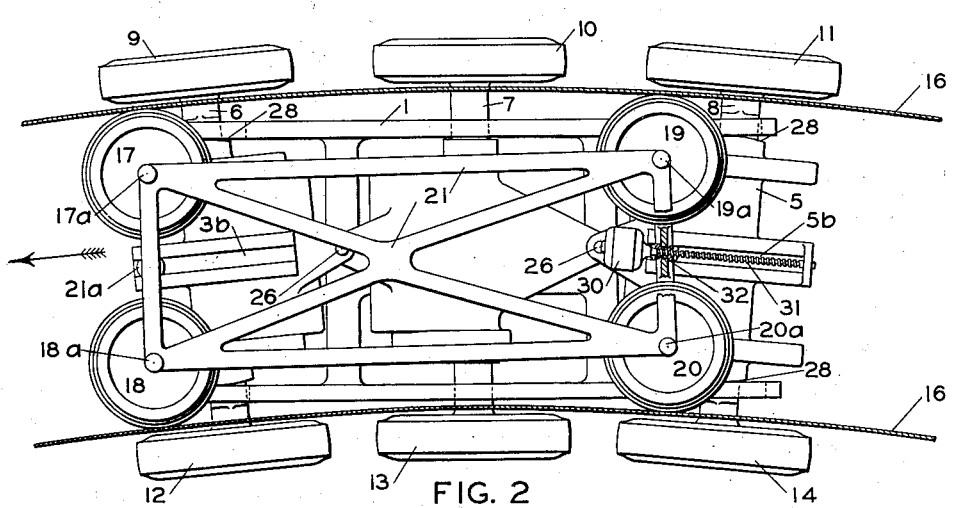

The guides 3b and 5b preferably bisect the axes of the end axles, extending the same distance on each side of an axis, at right angles thereto. They thus serve as crank arms by which the guide wheels such as 17 and 18 serve to swing the wheels such as 9 and 12 to conform to a curved track as shown in Fig. 2 when the frame 21 is shifted so that the point of contact of guide wheels such as 17 and 18 is in advance of the point of contact of the load wheels such as 9 and 12 on the tread of the track at 15.

Obviously shifting the frame 21 and the guide wheels 17 and 18 will place the same in the lead of the front wheels of the truck, 9 and 12, and at the same time will place the guide wheels 19 and 20 in the lead of the trailing load wheels 11 and 14.

The load wheels 10 and 13 will take a slight longitudinal shift under the influence of the articulation joints 26 but will be so arranged that the inside wheel on the curve such as 13 does not actually contact the upstanding flange 16 of the rail.

Figure 1:
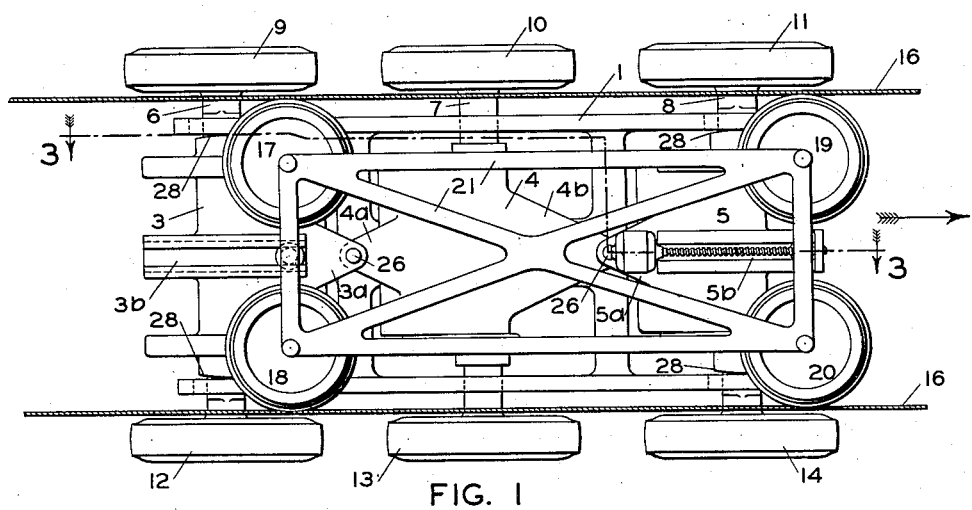

Obviously also when it is desired to proceed in the opposite direction, the guide wheel frame 21 will be shifted to the position shown in Figs. 1 and 3 at which time the guide wheels 19 and 20 will be in the lead and the whole truck unit will be reversed as to mode of operation and result when proceeding in the direction indicated by the arrow in Fig. 1.

For shifting the guide wheel frame 21 with respect to the axle mountings 3 and 5, I have shown a reversible electric motor 30 attached to a screw 31 and arranged to engage an internal threaded nut 32 which is connected with the guide wheel frame 21 in such a manner that when the motor is run or reversed a proportionate movement of the guide wheel frame 21 will be accomplished. This illustration of shifting means is diagrammatic, hence no control means for the motor 30 have been shown, since if it is desired to use a motor, appropriate control means are well known.

This disclosure is a modification of my patent referred to, principally in the matter of applying the guide wheels to the truck unit as a whole and is different from that disclosure in that all guide wheels are at all times in contact with the track regardless of the direction in which the truck is running, and it is believed to present some advantages over the disclosure referred to for conditions obtaining when the railway vehicle that it supports is going around a curve at high speed, so that centrifugal force becomes a major factor to be controlled.

Having thus disclosed my invention so that anyone familiar with the art to which it appertains may make and use the same, what I claim as new and desire to secure by Letters Patent, is,—

1. An articulated truck for rail vehicles comprising a frame, a plurality of articulated truck units of the character described mounted in said frame, a guide-wheel frame subjacent to the trucks and mounted in guides on the lower side of the end units that is selectively longitudinally movable with respect to the articulated truck units, pairs of horizontal guide wheels rotatably mounted on the guide wheel frame in spaced relationship that are effective to guide the end truck units by rail contact and means for shifting the guide wheel frame longitudinally with respect to the end truck units.

2. A guide wheel frame for an articulated truck of the character described comprising a substantially quadrangular frame member, horizontal guide wheels of the character described rotatably mounted at each angle thereof and a pair of centrally positioned end mountings on said guide wheel frame that are adapted to engage superposed articulated truck units for longitudinal movement only, with respect to said articulated truck units.

3. In a plural axle articulated truck, a guide wheel frame of the character described, mountings on the frame engageable with opposite end axle carrying means, means for limited longitudinal shifting of the guide wheel frame with respect to the axle carrying means and means for restraining movement in any other direction.

4. An articulated truck comprising a load carrying frame, a plurality of articulated axle mountings movably mounted in said frame, a guide-wheel frame subjacent said axle mountings that is restricted to longitudinal movement with respect thereto, a plurality of guide wheels mounted thereon and means connecting the guide wheel frame to the end units of said axle mountings that are adapted to swing said axle mountings with respect to said load carrying frame under the influence of the guide wheels.

5. The combination as characterized in claim 4 and including power operated means for selectively imparting longitudinal movement to the guide wheel frame with respect to the axle mountings.

6. In a plural axle truck, a plurality of articulated axle mountings, a main frame within which said axle mountings are mounted for relative movement, a shiftable guide wheel frame below the truck axles that is suspension mounted on the end axle mountings, pairs of horizontal guide wheels end mounted thereon that are adapted to contact a track at points ahead of the end truck wheels, the said guide wheel frame being adapted to move the axles with respect to the frame within which they are mounted under influence of guide wheel contact with a track.

7. The combination as characterized in claim 6 and including means for selectively shifting the guide wheel frame longitudinally, to place a pair of guide wheels in leading position with respect to a leading axle.

8. An articulated railway truck comprising a load frame and a plurality of articulated axle housings mounted in the frame, characterized by a guide frame that is mounted beneath the housings, a sliding joint connector between each end housing unit and the guide frame and a pair of guide wheels at each end of the guide frame that are arranged to bear against the upstanding portion of a track, in advance of said end housing units to hold them in relative position to a track, independently of load wheel bearing on a track.

9. A truck according to claim 8 characterized by a motor driven screw device for selectively shifting the guide frame, to bring a pair of guide wheels into track bearing ahead of the leading axle housing for either direction of movement.

RAY F. NEWTON.